INVENTOR
EWALD J. KIMM

BY
His ATTORNEY

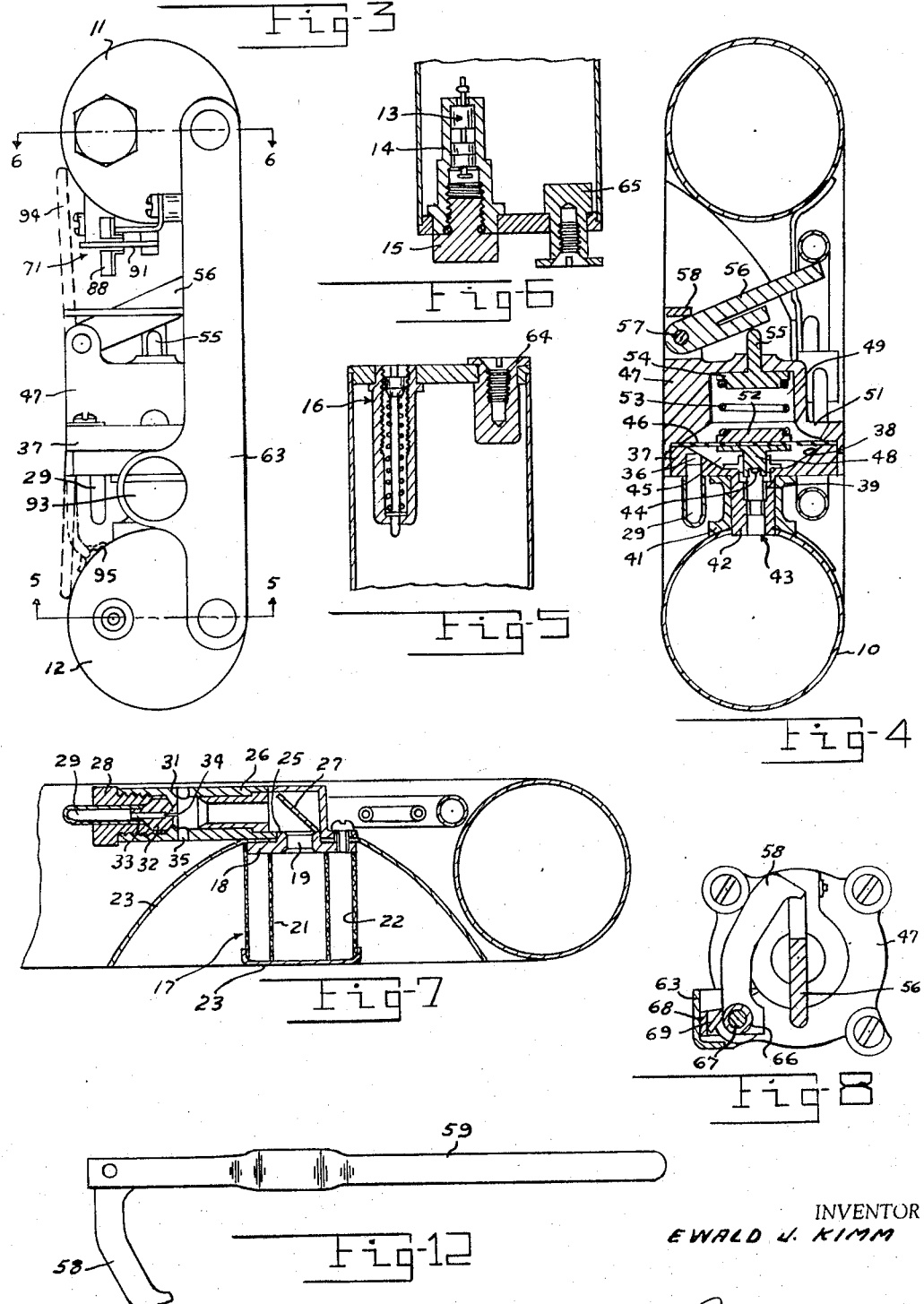

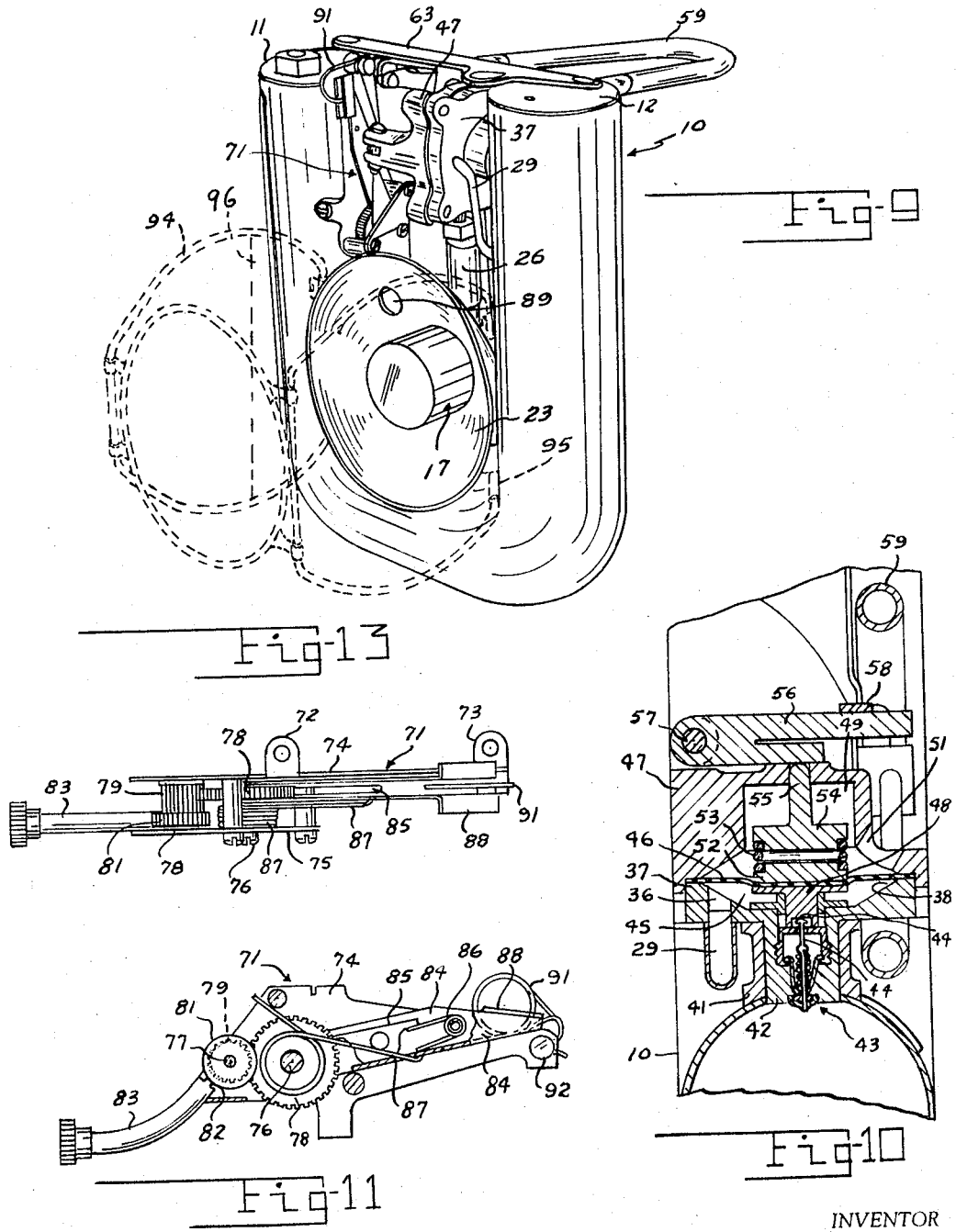

United States Patent Office 3,299,880
Patented Jan. 24, 1967

3,299,880
SURVIVAL HEATER
Ewald J. Kimm, Dayton, Ohio, assignor to United Aircraft Products, Inc., Dayton, Ohio, a corporation of Ohio
Filed June 30, 1965, Ser. No. 468,317
11 Claims. (Cl. 126—208)

This invention relates to personal use self contained portable heaters. Although not so limited it has special reference to survival heaters, that is, devices which will provide heat to sustain life during exposure in emergency situations.

An object of the invention is to provide a heater as described on such small, compact size as to enable it to be carried on the person, a particular object in this regard being to product a heater which will fit in the pocket of an airman's uniform, a hunter's jacket or the like.

Another object of the invention is to provide a heater characterized by compactness and small size as described but which is reliable in operation and capable of emitting a substantial amount of heat over a relatively long period.

A further object of the invention is to provide a heater as described incorporating its own starting mechanism.

Still another object of the invention is to provide a heater constructed to produce a substantial amount of heat as described but with major parts thereof sufficiently cool to the touch that the heater may be held in the hands while in operation.

A still further object of the invention is to provide the heater with safety controls, including one in which the heater automatically is shut off if inadvertently dropped while in use.

Other objects and structural details of the invention will appear from the following description when read in connection with the accompanying drawings, wherein:

FIG. 3 is an end view of the heater of FIG. 1;

FIG. 4 is a view in cross section taken substantially along the line 4—4 of FIG. 2;

FIG. 5 is a fragmentary view in longitudinal section, taken substantially along the line 5—5 of FIG. 3;

FIG. 6 is a view like FIG. 5, taken substantially along the line 6—6 of FIG. 3;

FIG. 7 is a fragmentary view in longitudinal section, taken substantially along the line 7—7 of FIG. 2;

FIG. 8 is a view like FIG. 7, taken substantially along the line 8—8 of FIG. 2;

FIG. 9 is a perspective view of the heater, showing the valve operating handle in an "open" position;

FIG. 10 is a detail enlarged view of parts taken from FIG. 4, showing the valve in an open position;

FIG. 11 is a detail view, with a side frame omitted, of a sparking device;

FIG. 12 is a detail view, in side elevation, of the valve opening handle at the heater; and FIG. 13 is a detail top plan view of the sparking device.

Figure 1:
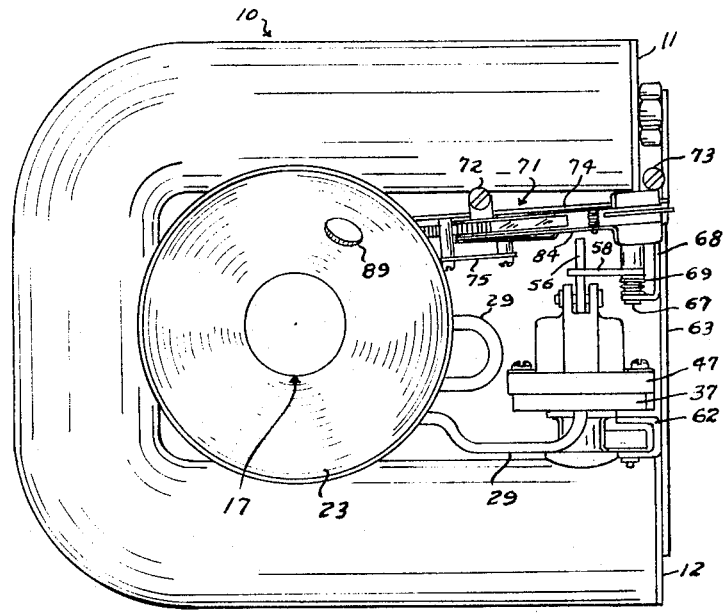
FIG. 1 is a top plan view of a heater in accordance with the illustrated embodiment of the invention.

Referring to the drawings, in its illustrated embodiment the device of the invention is a small, radiant heater adapted to be carried on the person and to be held in the hands when in use and incorporating in itself everything needed for its starting and its operation. Forming the body and chief support of the heater is a fuel storage tank 10 cylindrical in cross section and having its ends closed by caps 11 and 12. The tank is bent to assume a U-shape configuration having thus open and closed ends as well as defining open space between what may be considered the projecting legs thereof. Within such open space in a manner to be substantially contained by said projecting legs in the plane of the tank 10 are the operating and control elements of the heater. There is thus defined a unitary heater package conforming approximately in its overall dimensions to the dimensions of the tank 10. The latter is made small, as described, to fit a uniform or jacket pocket or otherwise conveniently to be carried on the person.

The tank 10 stores fuel in a liquid petroleum form, as for example, propane, this fuel having pressure-temperature characteristics making it particularly suitable for the present purposes. The fuel is admitted to the tank through a valve assembly 13 (FIG. 6) mounted in a sleeve 14 installed in cap 11. The outer end of the sleeve 14 is normally closed by a plug 15. The fuel is in a liquid state, under pressure, in the tank 10. In a controlled release thereof, in a manner to be described, escaping fuel assumes a gaseous state, for burning. A pressure relief valve 16 (FIG. 5) installed in the cap 12, limits the high pressure that may be reached in the tank 10.

Considering the operating and control parts contained in the space between the legs of the tank these include a burner unit 17 positioned midway between the described legs and somewhat closer to the closed end of the tank than to the open end. The unit 17 comprises a base plate 18 having a central opening 19 therein. Concentric inner and outer cylindrical screens 21 and 22 are mounted at their one ends on the plate 18 and closed at their opposite ends by a cap 23. With a combustible mixture of fuel and air entering the burner through opening 19, and by assistance of a catalytic coating thereon, the surface presented by screen 21 becomes a glowing heat emitting surface while outer screen 22 serves a confining, protecting function.

Fastened to the bottom of the burner plate 18 in a manner to extend in upward surrounding relation to the burner unit 17 is a reflector bowl 23, the upwardly facing surface of which is polished for efficient radiation of heat directed thereon from unit 17. Having a diameter of any suitable size, or as may be dictated by the overall dimensional character of the heater package, the reflector bowl 23 radiates a cone of heat upwardly and outwardly for absorption by the holder of the unit. The burner and bowl assembly is positioned as described by brackets 20 and 24 attached at their one ends to the plate 18 and secured in a suitable fashion, as by welding, at their outer ends to the tank 10.

The plate 18 has an upstanding lip 25 surrounding the opening 19. Fitting over the lip 25 is an opening near one end of a cylindrical body member 26 disposed longitudinally of the heater or in a direction at right angles to the axis of burner unit 17. The body member 26 is fastened to the plate in conjunction with and as a part of the same means by which bowl 23 is attached thereto. It is closed at what may be considered its inner end and mounts therein a deflector 27 in generally overlying relation to the opening 19. The opposite or outer end of the body 26 has a bushing 28 installed therein receiving the outer end of a fuel conducting tube 29. Ahead of the bushing 28 in body 26, and engaging an internal seat 31 therein, is an orifice member 32. A passage 33 in member 32 communicates at its one end with tube 29 and terminates at its other end in an orifice 34 adapted to discharge through the seat 31. Beyond seat 31 radial ports 35 communicate the interior of body 26 with the atmosphere.

The body member 26 thus provides a mixing chamber between seat 31 and deflector 27. Fuel discharged into such chamber through orifice 34 draws air thereinto through ports 35. The two fluids combine in a combustible mixture directed by deflector plate 27 into the burner unit 17.

The fuel supply tube 29 extends toward the closed end of the tank 10, loops circuitously beneath the reflector bowl 23 and then returns to the open end of the tank. There it is received in an opening 36 in a body 37. The latter has an interiorly sloping surface 38 terminating in a central opening 39. The body 37 seats on a cylindrical mount 41 welded or otherwise secured to the tank 10 in surrounding relation to an opening therein. A bushing 42 is installed in the mount 41 and has a tire or like valve unit 43 installed therein. The valve unit 43 is normally closed and is so held by the interior pressure in the tank 10, plus the pressure of the conventional spring which is an integral part of the valve. A plunger 44 extends upwardly from unit 43, and, when depressed, opens the valve unit for the escape of gas from the tank to flow past the valve. The escaping gas enters a chamber 45 as defined by the surface 38 and a diaphragm 46 peripherally clamped between the body 37 and an overlying body section 47. The chamber 45 communicates with opening 36 and the tube 29. An interponent 48 is interposed between the diaphragm 46 and plunger 44.

Above the diaphragm 46, in the body section 47, is a recess 49 communicating with the atmosphere through a port 51. A disc 52 bears on the diaphragm 46, in recess 49. A compression spring 53 is interposed between disc 52 and another superposed piston-like disc 54. A stem 55 on the latter has a sliding bearing in the upper end of body section 47 and projects through and beyond such upper end. The spring 53 normally maintains element 54 in the upper part of recess 49, as shown in FIG. 4, and, in so acting, is approximately fully extended whereby to be incapable of exerting sufficient pressure to open valve 43. However, a downward thrust on the element 54, applied through stem 55, compresses spring 53 increasing the pressure on diaphragm 46 enough to force plunger 44 inward and so open the valve 43. Release of the applied thrust to element 54 relieves spring 53 and allows valve 43 to reclose. It will be understood, however, that the valve 43 will in operation repeatedly open and close even though the element 54 be held thrust inward. This is a function of the pressure in chamber 45 with the action being one to maintain a substantially constant discharge pressure at the orifice 34.

Figure 2:
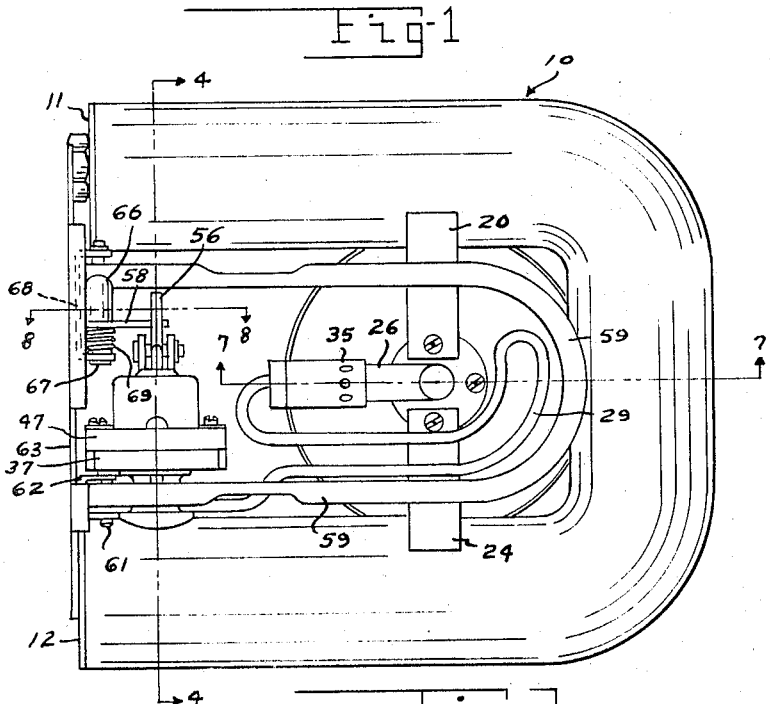
FIG. 2 is a bottom plan view of the heater of FIG. 1.

Activation of the element 54 is by a lever 56 pivoted at 57 to the body section 47 and resting on the stem 55. Lever 56 is in turn operated by a finger 58 carried by a tubular handle 59. The handle 59 is U-shaped. One of its legs is pivotally connected by a pin 61 to a bracket 62 fixed to a plate 63 bridging the open end of tank 10 and attached thereto by means including installed studs 64 and 65 (FIGS. 5 and 6). The other leg of handle 59 has a laterally projecting bearing portion 66 to which finger 58 is integrally connected. By means of a pin 67 the bearing portion 66 is pivotally connected to a bracket 68 on the plate 63. A torsion spring 69 is mounted on the bearing portion 66 to have one end engaged with finger 58 and the other end reacting on bracket 68. Under the urging of the spring the handle 59 tends normally to assume a stored, folded position as shown in FIGS. 1–4 where it lies flat against the heater and within the plane of the tank. In this position the finger 58 thereof occupies a position as shown in FIG. 4 where it is at the low end of lever 56 adjacent to the pivot 57. It is accordingly without effect on lever 56 which remains relatively elevated under the action of spring 53. However, should the handle 59 be raised or lifted from its stored position finger 58 slides along lever 58, moving from left to right as viewed in FIG. 4, camming the lever downward and applying an inward deflection to the piston-like element 54. Raising of the handle 59 thus has the effect of opening valve 43. In a fully actuated position the handle 59 assumes a position substantially 90° distant from its stored position. So extended it may serve as a foot rest, propping the heater in a partly elevated position, with the weight of the heater inhibiting a return movement of the handle. Normally, however, the heater is held in the hands in use, the operator gripping the tank 10 with one or both hands while holding the handle 59 extended by the fingers. In the latter regard, the handle 59 attempts constantly to return to a stored position under the urging of spring 69. Thus the handle must be held operated or extended to keep the heater in operation, and, should the heater inadvertently be dropped, the supply of fuel will be shut off and the burner extinguished.

The heater contains its own starting mechanism, this taking the form of a sparking device 71. A pair of longitudinally spaced apart brackets 72 and 73 mount the device 71 to a leg of the tank 10 in such manner to dispose one end of the device at the open end of the tank and the other end in underlying relation to the reflector bowl 23 near the burner 17. Frames 74 and 75 are the supports for the device 71. Interconnecting shafts 76 and 77 mount a toothed wheel 78 and a pinion 79 respectively. Also on the shaft 77 is a striker wheel 81 bearing on a piece of sparking metal 82, for example Ferrocerium. The metal 82 is housed in a tube 83 and spring urged in a conventional manner to engage the wheel 81. A lever 84 is pivotally mounted at its one end on the shaft 76 and carires a pawl 85 urged by a spring 86 to engage the teeth on wheel 78. A torsion spring 87 also is mounted on the shaft 76 and engages the lever 84 in a manner to urge it counterclockwise as viewed in FIG. 11 or in a direction to cause pawl 85 rotatively to advance the wheel 78. The opposite or outer end of the lever 84 is formed with a broadened thumb piece 88. By applying the finger thereto and pressing downward the lever 84 may be rocked clockwise against the urging of spring 87, with the pawl 85 ratcheting idly over the teeth on wheel 78. A sudden release of the lever allows it to return quickly in a counterclockwise direction as described. A rotational impulse thereby is given to wheel 78 and pinion 79, and through the latter to striker wheel 81. The motion of the wheel 81 is clockwise, as viewed, so that a produced spark is directed beyond the device 71 or generally toward the burner 17. The reflector bowl 23 has an opening 89 near to its bottom and the bowl is so oriented in a rotary sense as to position the opening for passage of the produced sparks therethrough. In the presence of gas at the burner 17, therefore, a spark from the device 71 will produce ignition.

In the illlustrated instance, catch means 91 is pivotally mounted on a stud 92 set in the plate 74 in a position to overlie thumbpiece 88 and hold the lever 84 depressed. By this means the lever may be cocked in a position stressing spring 87. A pivotal disabling movement of the catch means 91, as may conveniently be done by a finger movement by the operator, will thus produce a spark for ignition.

The handle 59 is on what may be considered the underside of the heater or on that side opposite the side from which reflector bowl 23 opens. Sparking device 71, on the other hand, is on the same side as bowl 23. To use the heater one or both side legs of the tank 10 are grasped and the heater held with bowl 23 facing upward. One hand then is used to rock the handle 59 downward and outward thereby admitting fuel to the burner 17. At the same time, or immediately after the rocking of handle 59, trigger device 71 is actuated and the issuing fuel-air mixture at the burner is ignited. Lever 84 of the sparking device is conveniently located for manipulation by the thumb while the fingers of the same hand rock the handle 59, if desired. Once ignited, the heater will continue to operate as long as the fuel control handle 59 is held rocked against the urging of spring 69 with a rate of combustion and effective heat radiation maintained constant by the movements of valve diaphragm 46 as described.

The fuel flowing circuitously through tube 29 tends to take on warmth from the bowl 23, making for more efficient combustion. The plate 63 has an eye 93 for attachment of a lanyard. The heater may be carried and used suspended from the neck, or attached elsewhere to the person or to a life raft or the like.

The heater is shown in an operating position in FIG. 9. The handle 59 is held open or outward by hand, by propping as described, or otherwise, as by being gripped between the knees. The heater operates in any position, the produced heat being chiefly radiated but with some convection currents rising around the bowl 23. Also as shown in FIGS. 3 and 9 the heater may advantageously be equipped with a collapsible guard 94 which when raised (FIG. 9) inhibits contact of positions of the body or clothing with the burner 17. Brackets 95 mount the guard 94 for collapsing adjustment into the plane of the tank 101 (FIG. 3). The guard 94 provides a convenient means for mounting a windbreaker 96 adapted to place burner 17 to the leeward side thereof.

Having thus described my invention, I claim:

1. A portable heater for personal use, including a fuel storage tank having opposite ends, a burner and a valve controlling flow of fuel from said tank to said burner, said valve being biased to a closed position, and manipulative means movable from a normal to an operated position to move said valve to an open position, said manipulative means being biased to a normal position releasing said valve for biasing to a closed position, said manipulative means being made large as a handle to be readily moved to and held in an operated position, said handle assuming an attitude in an operated position substantially at right angles to the body proper of the heater, said handle being pivotally connected to said tank near one end thereof, the opposite end of the tank being broad for stable contact with a supporting surface.

2. A portable heater for personal use, comprising a fuel storage tank and parts mounted on to form with said tank an integrated unit adapted to be operated while held in the hands, said parts including a burner, a normally closed valve for controlling flow of fuel from said tank to said burner, and a handle mounted for relative swinging movement by one hand while the other hand supports the heater, and means utilizing motion of said handle from a first to a second position to open said valve, said handle being biased from said second to said first position, requiring it to be held in said second position to maintain a flow of fuel to said burner, said handle in said first position occupying a stored position in adjacent generally parallel relation to said tank and in said second position occupying an outthrust position at generally right angles to said tank whereby to serve as a means to clamp the heater between the knees or to serve as a foot rest to prop the heater in a partly elevated position, the weight of the heater inhibiting return of said handle to its said first position.

3. A portable heater of compact, small size adapting it to be carried on the person for individual use, comprising a fuel storage tank of U-shape configuration, and parts mounted on to form with said tank an integrated unit that may be held in the hands while operating, said parts being substantially contained between the legs of said tank and including a burner facing outwardly of one side of the heater, a reflector bowl surrounding said burner, means for admitting fuel from said tank to said burner, and spark producing means for igniting the fuel at said burner, said means extending in part in underlying relation to said reflector bowl said bowl having an opening therein aligned to pass a spark to said burner.

4. A portable heater of compact, small size adapting it to be carried on the person for individual use, comprising a fuel storage tank of U-shape configuration, and parts mounted on to form with said tank an integrated unit that may be held in the hands while operating, said parts being substantially contained between the legs of said tank and including a burner facing outwardly of one side of the heater, a reflector bowl surrounding said burner, said burner and surrounding reflector defining an upwardly facing side of the heater, a normally closed valve controlling fuel flow from said tank to said burner, a handle extending longitudinally of said tank on the opposite or downwardly facing side of the heater and movable from a stored position alongside the tank to an operated position projecting angularly away from the tank, and means utilizing motion of said handle to operated position to open said valve.

5. A portable heater of compact, small size adapting it to be carried on the person for individual use, comprising a fuel storage tank of U-shape configuration, and parts mounted on to form with said tank an integrated unit that may be held in the hands while operating, said parts being substantially contained between the legs of said tank and including a burner facing outwardly of one side of the heater, a reflector bowl surrounding said burner, and means for admitting fuel from said tank to said burner, said means including tubing leading from said tank to said burner and passing circuitously in underlying adjacent relation to said reflector bowl.

6. A portable heater of compact, small size adapting it to be carried on the person for individual use, comprising a fuel storage tank of U-shaped configuration, and parts mounted on to form with said tank an integrated unit that may be held in the hands while operating, said parts being substantially contained between the legs of said tank and including a burner disposed near the closed end of the tank, a normally closed valve mounted intermediate said burner and the open end of the tank controlling flow of fuel from said tank to said burner, means for opening said valve, and igniting means disposed longitudinally between said legs to have one end extending adjacent to said burner and to have the other end extending to the open end of said tank, said other end comprising manipulative means presented for finger operation by one of the hands holding the heater.

7. A portable heater according to claim 6, characterized in that said valve opening means comprises a handle pivotally connected to the tank at said open end, said handle having a stored position disposed lengthwise of the tank in adjacent relation thereto and on a side of the tank opposite to that from which said burner faces.

8. A portable heater of compact, small size adapting it for holding in the hands in use, including a burner, a fuel storage tank in at least partly surrounding spaced relation to said burner, bracket means extending from said tank to support said burner, a normally closed valve mounted on said tank to lie near to said burner and also at least partly surrounded by said tank, said burner, said tank and said valve occupying substantially a common horizontal plane, a valve actuator occupying a stored position within said horizontal plane and pivotal to an angular relatively projecting position to open said valve, and means on said tank mounting said valve actuator for pivotal motion as described.

9. A portable hand held heater adapted automatically to shut off if dropped, including a fuel storage tank, a burner, a pivotal control part biased to a first position and movable by hand to a second position, and a normally closed valve means controlling fuel flow from said tank to said burner and opened by movement of said part to said second position, said part being required to be held in said second position to maintain fuel flow to said burner, said valve means including a valve biased to a closed position, a diaphragm deflectable to open said valve, yielding means bearing on one side of said diaphragm and adapted when compressed to deflect said diaphragm to open said valve, the opposite side of said diaphragm being exposed to fluid pressure from said tank in the open position of said valve, and a plunger operable by said part in moving to said second position to compress said yielding means.

10. A portable heater of compact, small size adapting it to be carried on the person for individual use, comprising a fuel storage tank of U-shaped configuration, and parts mounted on to form with said tank an integrated unit that may be held in the hands while operating, said parts being substantially contained between the legs of said tank and including a burner facing upwardly from the horizontal plane of said tank, a normally closed valve controlling flow of fuel from said tank to said burner, and a valve actuator occupying normally a stored position substantially within the horizontal plane of said tank in underlying relation to said burner to face oppositely to said burner or downwardly from the horizontal plane of said tank, said actuator being pivotally connected to said tank and arranged to be swung outwardly from said stored position to an outthrust downwardly projecting relation to said tank where it may be suitably held or used as a prop to mount the heater in an attitude of use, motion of said actuator to said downwardly projecting position being utilized to open said normally closed valve.

11. A portable heater of compact, small size adapting it to be carried on the person for individual use, comprising a fuel storage tank of U-shaped configuration, and parts mounted on to form with said tank an integrated unit that may be held in the hands while operating, said parts being substantially contained between the legs of said tank and including a burner disopsed near the closed end of the tank, a normally closed valve mounted intermediate said burner and the open end of the tank controlling flow of fuel from said tank to said burner, means for opening said valve, said means including a handle biased to occupy a first stored position in adjacent generally parallel relation to said tank and pivotally movable to a second position outthrust from said tank, said handle being pivotally connected to said tank near the open end thereof, motion of said handle to said second position being utilized to open said valve, igniting means disposed longitudinally between said legs to have one end extending adjacent to said burner and to have the other end extending toward the open end of said tank, said other end comprising manipulative means disposed near to said handle whereby a person using the heater may hold it in one hand while using the other hand to move said handle to its said second position and while it is there held to manipulate said igniting means.

References Cited by the Examiner
UNITED STATES PATENTS

| | | | |
|---|---|---|---|
| 1,269,517 | 6/1918 | Bader | 126—52 |
| 2,914,060 | 11/1959 | Wilcox | 126—208 |
| 2,928,386 | 3/1960 | Keyt et al. | 126—38 |
| 3,144,014 | 8/1964 | Mantell | 126—38 |

FREDERICK L. MATTESON, Jr., *Primary Examiner.*

E. G. FAVORS, *Assistant Examiner.*